(12) United States Patent
Shiraishi

(10) Patent No.: US 7,391,548 B2
(45) Date of Patent: Jun. 24, 2008

(54) OPTICAL BEAM SCANNING DEVICE AND IMAGE FORMING APPARATUS

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/581,755

(22) Filed: Oct. 17, 2006

(65) Prior Publication Data
US 2007/0097475 A1    May 3, 2007

Related U.S. Application Data

(63) Continuation-in-part of application No. 11/195,661, filed on Aug. 3, 2005, now abandoned.

(51) Int. Cl.
G02B 26/08    (2006.01)

(52) U.S. Cl. ..................................... 359/205

(58) Field of Classification Search .......... 359/205–208
See application file for complete search history.

(56) References Cited

U.S. PATENT DOCUMENTS

| | | | |
|---|---|---|---|
| 5,751,462 A | 5/1998 | Shiraishi et al. | |
| 5,808,772 A | 9/1998 | Yamaguchi et al. | |
| 6,337,757 B1 | 1/2002 | Shiraishi et al. | |
| 6,965,466 B2 | 11/2005 | Ishihara | |
| 2004/0223048 A1 | 11/2004 | Shiraishi et al. | |
| 2005/0173625 A1 | 8/2005 | Shiraishi | |

Primary Examiner—Euncha P Cherry
(74) Attorney, Agent, or Firm—Foley & Lardner LLP

(57) ABSTRACT

An optical beam scanning device and an image forming apparatus are capable of suppressing adverse effect due to ambient temperature change on plural optical elements. The optical beam scanning device includes a single light deflector, a pre-deflection optical system which is entered a beam from a light source into the light deflector, and a post-deflection optical system which images a reflection beam from the light deflector on a scanned surface, and integrates at least one optical element of the pre-deflection optical system and at least one optical element of the post-deflection optical system. For example, the integrated optical element of the post-deflection optical system is an fθ lens, and the optical element of the pre-deflection optical system is a correction lens which alleviates an influence by temperature change of the post-deflection optical system.

16 Claims, 7 Drawing Sheets

FIG.3

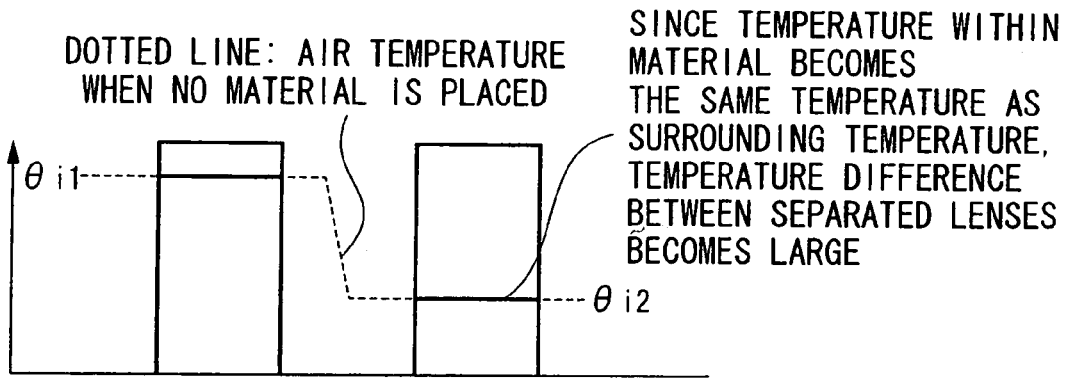

FIG.4

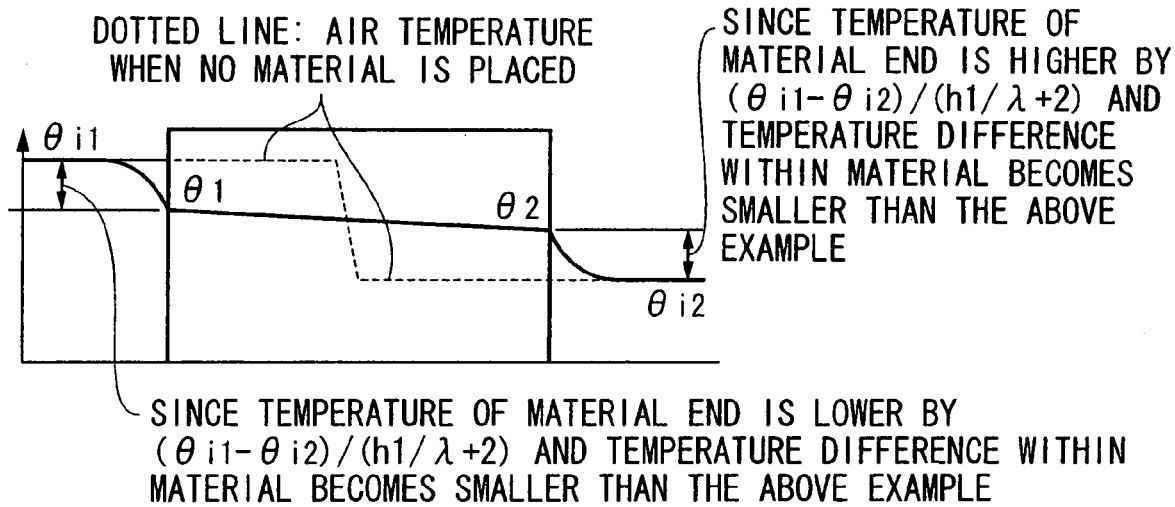

FIG.5

| HEAT TRANSFER COEFFICIENT (kcal/m²h) | DISTANCE BETWEEN TWO LENSES (m) | HEAT CONDUCTIVITY (kcal/mh) | SURROUNDING TEMPERATURE OF CORRECTION LENS (°C) | SURROUNDING TEMPERATURE OF LENS AFTER DEFLECTION (°C) | END TEMPERATURE OF CORRECTION LENS PART (°C) | END TEMPERATURE OF CORRECTION LENS PART AFTER DEFLECTION (°C) |
|---|---|---|---|---|---|---|
| $h$ | $l$ | $\lambda$ | $\theta i1$ | $\theta i2$ | $\theta 1$ | $\theta 2$ |
| 1 | 0.1 | 0.065 | 15 | 0 | 10.76087 | 4.23913 |

BASE MEMBER (CONNECTING MEMBER) 22

OPTICAL BEAM SCANNING DEVICE AND IMAGE FORMING APPARATUS

CROSS-REFERENCE TO RELATED APPLICATION

This application is a continuation-in-part of U.S. patent application Ser. No. 11/195,661, filed Aug. 3, 2005, now abandoned.

BACKGROUND OF THE INVENTION

The present invention relates to an image forming apparatus such as a laser printer or digital copier, and an optical beam scanning device available in such an image forming apparatus. Further, the invention relates to an optical component applied to an optical beam scanning device.

Conventionally, in order to suppress the variations in beam positions and defocus generation caused by the influence of temperature and humidity change or the like, there has been an optical beam scanning device with a correction optical element for producing opposite beam position change to the beam position change produced in a post-deflection optical system due to temperature and humidity change and generating opposite defocus to the amount of defocus generation provided in a pre-deflection optical system. For example, U.S. Pat. No. 6,337,757 discloses an optical beam scanning device having such a correction optical element.

In the case of such an optical beam scanning device, the device has been designed on the assumption that the temperature and humidity relationship between an optical element in a post-deflection optical system and the above described correction optical element in the pre-deflection optical system is a predetermined relationship. When the actual use conditions are different form the design conditions, sometimes the correction does not work properly, or contrary deteriorate the characteristics thereof.

For example, assuming that the correction optical element is designed under condition that the temperature and humidity are the same with the optical element in the post-deflection optical system and the correction optical element in the pre-deflection optical system and, when the temperature changes by $\Delta T$, the amount of defocus generation in a sub-scanning direction in the post-deflection optical system is $\Delta DFCS$ (sub) and the amount of defocus generation in a main scanning direction is $\Delta DFCS$ (main), for canceling the amounts, the pre-deflection optical system is designed so that the amount of defocus generation in the sub-scanning direction is generated by $-\Delta DFCS$ (sub) and the amount of defocus generation in the main scanning direction is generated by $-\Delta DFCS$ (main) when the temperature change of the correction optical element in the pre-deflection optical system is $\Delta T$ (given that there is no temperature change in the post-deflection optical system). By the combination of them, when the temperature of the optical element of the post-deflection optical system and the correction optical element in the pre-deflection optical system changes by the same $\Delta T$, the total defocus in the main scanning direction and the sub-scanning direction can be made zero. However, when there is no temperature change in the post-deflection optical system and only the temperature of the correction optical element in the pre-deflection optical system changes by $\Delta T$, overall, the amount of defocus generation in the sub-scanning direction is generated by $-\Delta DFCS$ (sub) and the amount of defocus generation in the main scanning direction is generated by $-\Delta DFCS$ (main).

In practice, the post-deflection optical system and the correction optical element in the pre-deflection optical system are provided within an image forming apparatus as equal elements in the optical beam scanning device; however, in the image forming apparatus, heat sources such as a fixing unit for fixing toner on paper and cooling units such as a radiation fan are variously provided, and the conduction direction and convection of the heat from the heat sources and cooling units are not simple, and thereby, there is a possibility that the temperature changes are different between the post-deflection optical system and the correction optical element in the pre-deflection optical system.

Further, generally, the optical element of the post-deflection optical system is large under the necessity of passing a deflected beam, and the optical element of the pre-deflection optical system is located prior to scanning and small. Accordingly, the responsiveness to ambient temperature change is different, and there is a possibility that temperature changes are different between the post-deflection optical system and the optical element of the pre-deflection optical system.

When the size as a component is different, the complication of work for mounting with precision is also different. The mounting work takes a longer time for a smaller optical element, and even if it takes a long time to mount the element, the above described defocus problem occurs. In the case where mounting precision is not adjusted, when the distance between mounting reference planes is short, the influence by an error of the mounting planes or the mounting parts of the optical elements on the mounting angle becomes greater. The size is desirably larger for suppressing the inclination at the time of mounting of optical elements.

SUMMARY OF THE INVENTION

An object of an aspect of the invention is to provide an optical beam scanning device, an image forming apparatus, and an optical member for optical beam scanning device capable of suppressing adverse effect due to ambient temperature change on plural optical elements.

Another object of an aspect of the invention is to provide an optical beam scanning device, an image forming apparatus, and an optical member for optical beam scanning device in which mounting work for smaller optical element can be easily performed while securing sufficient mounting precision.

An optical beam scanning device according to an aspect of the invention includes: a single light deflector; a pre-deflection optical system which is entered a beam from a light source into the light deflector; a post-deflection optical system which images a reflection beam from the light deflector on a scanned surface, wherein at least one optical element of the pre-deflection optical system is integrated with at least one optical element of the post-deflection optical system.

An image forming apparatus according to an aspect of the invention includes: an optical beam scanning device having a single light deflector, a pre-deflection optical system which is entered a beam from a light source into the light deflector, and a post-deflection optical system which images a reflection beam from the light deflector on a scanned surface, and integrating at least one optical element of the pre-deflection optical system and at least one optical element of the post-deflection optical system; and a photoconductor including the scanned surface on which a latent image is formed based on the beam from the optical beam scanning device.

An optical component for optical beam scanning device according to an aspect of the invention is formed by integrating at least one optical element of the pre-deflection optical system of an optical beam scanning device and at least one optical element of the post-deflection optical system of the optical beam scanning device.

BRIEF DESCRIPTION OF THE DRAWINGS

FIG. 3 is an explanatory view showing a temperature distribution model in the case where separate materials are placed in air at different temperatures;

FIG. 4 is an explanatory view showing a temperature distribution model in the case where one material is provided at a boundary position of air at different temperatures;

FIG. 5 is a chart providing parameter conditions of a temperature distribution in the case where one material is provided at a boundary position of air at different temperatures and temperatures at both ends of the material under the conditions;

DETAILED DESCRIPTION OF THE INVENTION (A) First Embodiment

Hereinafter, a first embodiment of an optical beam scanning device and an image forming apparatus according to the invention will be described. The optical beam scanning device of the first embodiment is a four-beam optical beam scanning device, and the image forming apparatus of the first embodiment is a color image forming apparatus.

Figure 1:
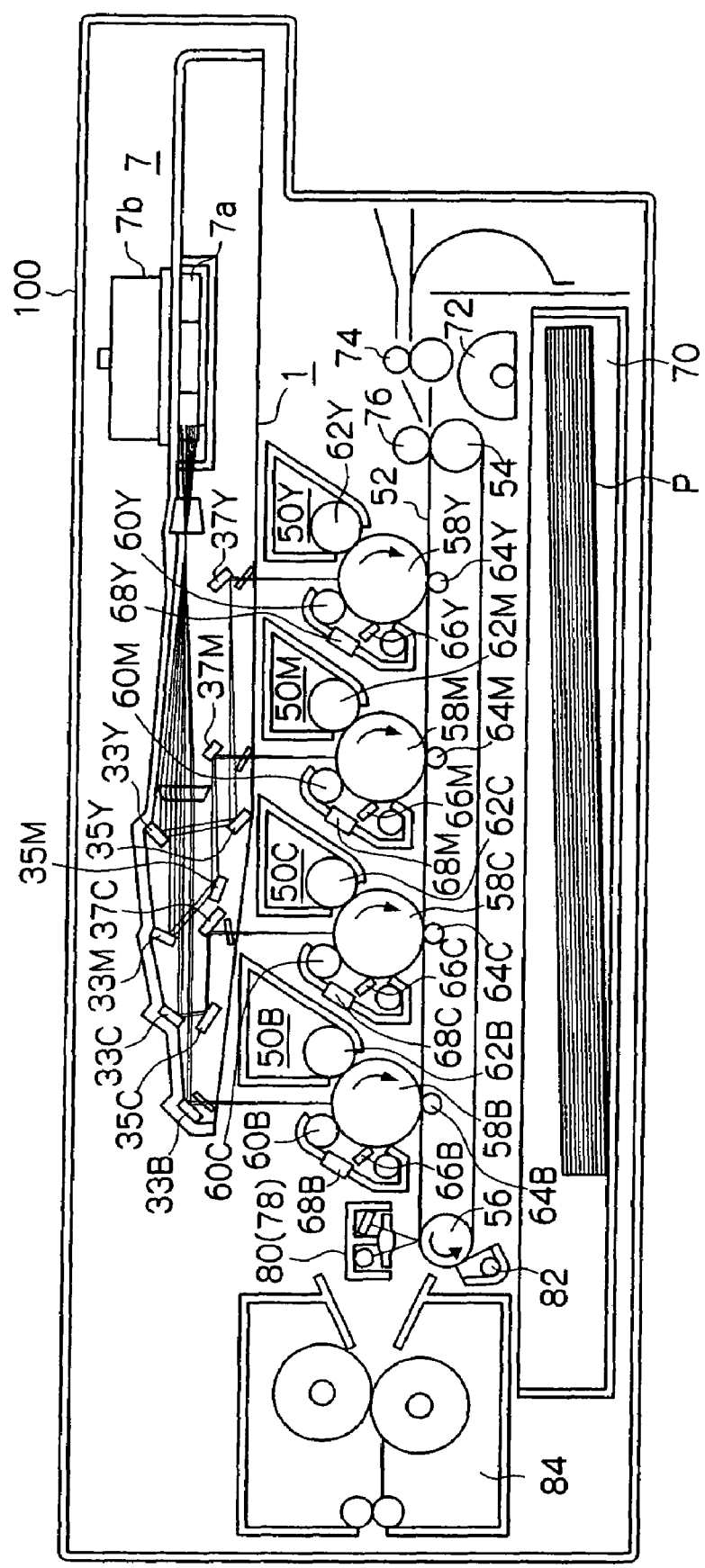
FIG. 1 is a schematic longitudinal sectional view of a color image forming apparatus of a first embodiment, to which a four-beam optical beam scanning device is applied.

FIG. 1 shows a color image forming apparatus using a four-beam optical beam scanning device as the first embodiment. FIG. 1 is a schematic longitudinal sectional view of the color image forming apparatus according to the first embodiment.

In this type of color image forming apparatus, normally, four kinds of image data color-separated with respect to each of color components of Y (yellow), M (magenta), C (cyan), and B (black) and four sets of various units for forming images with respect to each of color components corresponding to Y, M, C, and B, respectively, are used. Accordingly, image data with respect to each of color components and corresponding units are identified by adding Y, M, C, and B to the respective reference signs.

As shown in FIG. 1, an image forming apparatus 100 has first to fourth image forming units 50Y, 50M, 50C, and 50B for forming images with respect to each of color-separated color components.

The respective image forming units 50 (Y, M, C, and B) are arranged in the order of image forming units 50Y, 50M, 50C, and 50B below a multibeam optical beam scanning device 1 respectively corresponding to positions from which laser beams L (Y, M, C, and B) are emitted for optically scanning image information of the respective color components by a first mirror 33B and third mirrors 37Y, 37M, and 37C of the optical beam scanning device 1, which will be described in detail using FIG. 2.

A transport belt 52 for transporting transfer materials on which images formed through the respective image forming units 50 (Y, M, C, and B) are transferred is provided below the respective image forming units 50 (Y, M, C, and B).

The transport belt 52 is wound around a belt drive roller 56 rotated in a direction of an arrow by a motor (not shown) and a tension roller 54, and rotated at a predetermined speed in the direction in which the belt drive roller 56 is rotated.

The respective image forming units 50 (Y, M, C, and B) have photoconductor drums 58Y, 58M, 58C, and 58B formed in cylindrical shapes rotatable in the arrow direction, on which electrostatic latent images corresponding to images exposed by the optical beam scanning device 1 are formed.

Around the respective image forming units 50 (Y, M, C, and B), charging units 60 (Y, M, C, and B) for providing predetermined potentials to the surfaces of the respective photoconductor drums 58 (Y, M, C, and B), developing units 62 (Y, M, C, and B) for developing by supplying toner provided with colors corresponding to the electrostatic latent images formed on the surfaces of the respective photoconductor drums 58 (Y, M, C, and B), transfer units 64 (Y, M, C, and B) for transferring toner images of the respective photoconductor drums 58 (Y, M, C, and B) on a recording medium, i.e., recording paper P to be opposed to the respective photoconductor drums 58 (Y, M, C, and B) from the rear surface of the transport belt 52 via the transport belt 52 in between with the respective photoconductor drums 58 (Y, M, C, and B) and transported by the transport belt 52, cleaners 66 (Y, M, C, and B) for removing the residual toner on the photoconductor drums 58 (Y, M, C, and B) that is not transferred at the time of the transfer of the toner images onto the paper by the respective transfer units 64 (Y, M, C, and B), and discharging units 68 (Y, M, C, and B) for removing residual potentials left on the photoconductor drums 58 (Y, M, C, and B) after transfer of the toner images by the respective transfer units 64 (Y, M, C, and B) are sequentially arranged along the direction in which the respective photoconductor drums 58 (Y, M, C, and B) are rotated.

Below the transport belt 52, a paper cassette 70 is provided for accommodating recording paper P onto which images formed by the respective image forming units 50 (Y, M, C, and B) are to be transferred.

At one end of the paper cassette 70 close to the tension roller 54, a feed roller 72 formed in a general semilunar shape for taking out the paper P accommodated in the paper cassette 70 one by one from the uppermost part is provided.

Between the feed roller 72 and tension roller 54, a registration roller 74 is provided for registering the leading end of one piece of paper P taken out from the cassette 70 with the leading end of the toner image formed on the photoconductor drum 58B of the image forming unit 50B (black).

In a position near the tension roller 54 between the registration roller 74 and the first image forming unit 50Y, substantially opposed on the outer circumference of the transport belt 52 corresponding to the position in which the tension roller 54 and the transport belt 52 are in contact, an adhesion roller 76 for providing a predetermined electrostatic adhesion force to the one piece of paper P to be transported with predetermined timing by the registration roller 74.

At one end of the transport belt 52 near the drive roller 56 on the outer circumference of the transport belt 52 substantially in contact with the belt drive roller 56, registration sensors 78 and 80 for sensing positions of the image formed on the transport belt 52 or the image transferred on the paper P are arranged at a predetermined distance in an axial direction of the belt drive roller 56 (since FIG. 1 is a front sectional view, the first sensor 78 located at the front side of the paper is not seen in FIG. 1).

In a position on the outer circumference of the transport belt 52 in contact with the belt drive roller 56 but never being in contact with the paper P transported by the transport belt 52, a transport belt cleaner 82 is provided for removing the toner attached onto the transport belt 52, paper dust of the paper P, etc.

In a direction in which the paper P transported via the transport belt 52 is separated from the belt drive roller 56 and further transported, a fixing unit 84 is provided for fixing the toner images transferred onto the paper P into the paper P.

Figure 2:
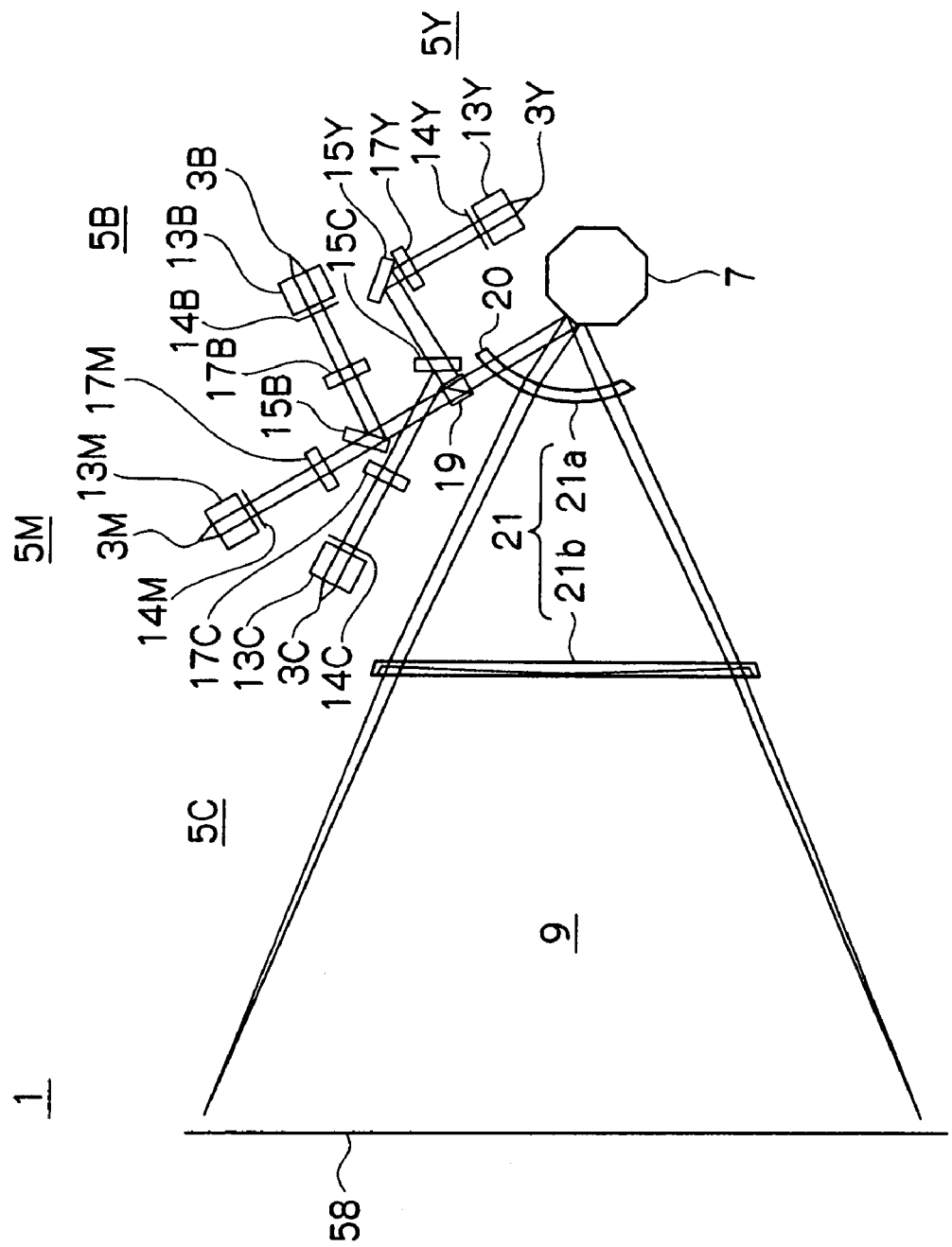
FIG. 2 is a schematic plan view showing an arrangement of optical elements of the four-beam optical beam scanning device incorporated in the image forming apparatus in FIG. 1.

FIG. 2 shows a multibeam optical beam scanning device (four-beam optical beam scanning device) 1 incorporated in the image forming apparatus 100 shown in FIG. 1. A post-deflection optical system is shown by developing the folds by the mirrors thereof.

The multibeam optical beam scanning device 1 has light sources 3Y, 3M, 3C, and 3B outputting optical beams toward the first to fourth image forming units 50Y, 50M, 50C, and 50B shown in FIG. 1, respectively, and only one light deflector 7 as deflecting means for deflecting (scanning) optical beams (laser beams) emitted from the light sources 3 (Y, M, C, and B) toward image planes located in predetermined positions, i.e., the outer circumferential surfaces of the photoconductor drums 58Y, 58M, 58C, and 58B of the first to fourth image forming units 50Y, 50M, 50C, and 50B shown in FIG. 1 at a predetermined angular speed. Pre-deflection optical systems 5 (Y, M, C, and B) are provided between the light deflector 7 and the respective light sources 3 (Y, M, C, and B) and a post-deflection optical system 9 is provided between the light deflector 7 and the image planes, respectively.

As shown in FIG. 2, the pre-deflection optical systems 5 include the light sources 3 (Y, M, C, and B) of semiconductor laser elements with respect to each color component, lenses (finite lenses or collimator lenses; described as finite lenses below) 13 (Y, M, C, and B) for providing predetermined convergence or divergence angles to the laser beams output from the respective light sources 3 (Y, M, C, and B), diaphragms 14 (Y, M, C, and B) for providing arbitrary sectional beam shapes to the laser beams L that have passed through the finite focus lenses 13 (Y, M, C, and B), cylinder lenses 17 (Y, M, C, and B) further providing predetermined convergence to beams that have passed through the diaphragms 14 (Y, M, C, and B) with respect to the sub-scanning direction, and shape the sectional beam shapes of the laser beams output from the respective light sources 3 (Y, M, C, and B) in predetermined shapes and guide the beams to the deflection surface of the light deflector 7.

The yellow laser beam LY output from the cylinder lens 17Y is folded by the mirror 15Y, and then, passes through below (or above) the mirror 15C, is reflected by a polarizing beam splitter (or half mirror) 19 and guided to the deflection surface of the light deflector 7. The magenta laser beam LM output from the cylinder lens 17M passes through below (above) the mirror 15B, and then, passes straight through the polarizing beam splitter 19 and is guided to the deflection surface of the light deflector 7. The cyan laser beam LC output from the cylinder lens 17C has an optical path thereof folded by the mirror 15C, and is reflected by the polarizing beam splitter 19 and guided to the deflection surface of the light deflector 7. The black laser beam LB output from the cylinder lens 17B has an optical path thereof folded by the mirror 15B, and is transmitted through the polarizing beam splitter 19 and guided to the deflection surface of the light deflector 7.

The light deflector 7 has a polygon mirror 7*a* in which, for example, eight-facet flat reflection surfaces (flat reflection mirrors) are arranged in a regular polygon form, and a motor 7*b* for rotating the polygon mirror 7*a* at a predetermined speed in a main scanning direction.

In the case of the first embodiment, in order to suppress the variations in beam positions and defocus generation caused by the influence of temperature and humidity change or the like, a correction optical element 20 is provided between the polarizing beam splitter 19 and the polygon mirror 7*a* for producing opposite beam position change to the beam position change produced in the post-deflection optical system 9 due to temperature and humidity change and generating opposite defocus to the amount of defocus generation. The correction optical element 20 is a free shaped surface lens passing laser beams of all color components and having a negative power in the sub-scanning direction.

The post-deflection optical system 9 includes a pair of fθ lenses (imaging lenses) 21 (21*a* and 21*b*) for optimizing the shapes and positions of the laser beams L (Y, M, C, and B) deflected (scanned) by the polygon mirror 7*a* on the image planes, and plural mirrors 33Y, 35Y, and 37Y, 33M, 35M, and 37M, 33C, 35C, and 37C, and 33B for guiding the laser beams L (Y, M, C, and B) with respect to each of color components output from the pair of fθ lenses 21 to the corresponding photoconductor drums 58 (Y, M, C, and B) as shown in FIG. 1.

In the case of the first embodiment, as shown in FIG. 2, the correction optical element 20 in the pre-deflection optical system 5 and the fθ lens 21*a* closest side to the light deflector 7 are integrally molded. For example, the correction optical element 20 of a resin lens (or glass lens) and the fθ lens 21*a* may be integrally molded initially, or separately molded parts may be bonded or welded.

Figure 8:
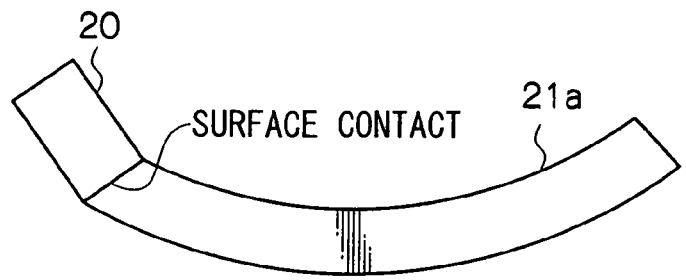
FIG. 8 is explanatory views of integration by surface contact.

In the case where the separately molded parts are bonded or welded to be integrated, the correction optical element 20 and the fθ lens 21*a* are preferably the same material or have substantially equal heat conductivity even when a material is different. For example, the substantially equal heat conductivity indicates a case where a ratio of two heat conductivities ranges from 0.3 to 3.4. Moreover, in the case where the separately molded parts are bonded or welded to be integrated, as shown in FIG. 8, an integrated side end of the correction optical element 20 and an integrated side end of the fθ lens 21*a* are preferably brought into surface contact with each other. However, the contact surface is not limited to a flat surface. This is because the surface contact can prevent an air layer disposed between the both surfaces and enables a certain degree of heat conductivity.

The integrated correction optical element 20 in the pre-deflection optical system 5 and the fθ lens 21*a* become more likely to be affected equally by the ambient temperature (or humidity) change and, when the temperature (or humidity) change is different, the influence by the difference is quickly reduced.

In the case where the post-deflection optical system 9 includes plural fθ lenses and distances between the lenses are long, in comparison of influences of lenses having absolute values nearly equal powers, the closer the fθ lens to the light deflector 7, the greater the influence on the defocus becomes. Accordingly, the configuration which integrates the fθ lens 21a closest side to the light deflector 7 with the correction optical element 20 as shown in FIG. 2 is especially effective in the case where the post-deflection optical system 9 includes plural fθ lenses and distances between the lenses are long, and the absolute values of the powers in the sub-scanning direction are nearly equal between the fθ lenses 21a and 21b, or the absolute value of the power of the fθ lens 21a is larger.

As below, the significance of integration of the correction optical element 20 in the pre-deflection optical system 5 and the fθ lens 21a will be described from an aspect of temperature change.

The heat transfer within the optical system unit of the optical beam scanning device involves heat conduction within a solid and heat transfer as heat exchange between air and the solid. The temperature of the air within the unit generally differs according to the location by the internal airflow, external and internal heating source, cooling from the outside, etc. When ambient air is at uniform temperature, the temperature of a material placed within follows the temperature. On the other hand, a material placed in nonuniform air has a temperature gradient, and the temperature difference becomes smaller than the temperature difference between separate materials placed in air at different temperatures.

FIGS. 3 and 4 show modeled temperature distributions as described above. FIG. 3 shows the case where separate materials (the correction optical element 20 and the fθ lens 21a) are placed in air at different temperatures, and FIG. 4 shows the case where one material (or integrated material; the integrated correction optical element 20 and fθ lens 21a) is provided at a boundary position of air at different temperatures. Assuming that the temperature of air surrounding the correction optical element 20 is $\theta i1$ and the temperature of air surrounding the fθ lens 21a of the post-deflection optical system 9 is $\theta i2$, when they are separately provided as separate lenses, the temperatures of the respective lenses 20 and 21a become the same as the ambient temperature as shown in FIG. 3. On the other hand, when these lenses 20 and 21a are integrated, the temperature distribution becomes as shown in FIG. 4.

As below, how the end temperatures $\theta 1$ and $\theta 2$ of the correction optical element 20 and the fθ lens 21a of the post-deflection optical system 9 become will be considered in the modeling as shown in FIG. 4.

The amount of heat Q1 flowing per unit time from the surrounding air of the correction optical element 20 into the correction optical element 20 through material surface A (A also represents a surface area) because of heat transfer can be expressed by equation (1), and the amount of heat Q2 flowing per unit time from the surrounding air of the fθ lens 21a into the fθ lens 21a can be expressed by equation (2). In equations (1) and (2), $\theta 1$ is end temperature of the correction optical element 20, $\theta 2$ is end temperature of the fθ lens 21a, and h is a heat transfer coefficient of the static air.

$$Q1 = hA(\theta i1 - \theta 1) \qquad (1)$$

$$Q2 = hA(\theta 2 - \theta i2) \qquad (2)$$

The amount of heat Q3 moving from the end of the correction optical element 20 to the fθ lens 21a, which have been integrally formed, by heat transfer can be expressed by equation (3). In equation (3), λ is heat conductivity and 1 is a distance between the end of the correction optical element 20 and the end of the fθ lens 21a.

$$Q3 = \lambda A(\theta 1 - \theta 2)/1 \qquad (3)$$

Since the amounts of heat Q1 to Q3 in equations (1) to (3) are equal, these are solved as a simultaneous equation with respect to $\theta 1$ and $\theta 2$ to obtain equations (4) and (5).

$$\theta 1 = \{hl\theta i1 + \lambda(\theta i1 + \theta i2)\}/(hl + 2\lambda) \qquad (4)$$

$$\theta 2 = \{hl\theta i2 + \lambda(\theta i1 + \theta i2)\}/(hl + 2\lambda) \qquad (5)$$

FIG. 5 shows values of $\theta 1$ and $\theta 2$ in the case where arbitrary values are set as parameters h, 1, λ, $\theta i1$, and $\theta i2$ (generally practical values are selected). Under the condition in FIG. 5, the end temperature $\theta 1$ of the correction optical element 20 and the end temperature $\theta 2$ of the fθ lens 21a become about 10.8 degrees and about 4.2 degrees, respectively, and the reduction in the differences from temperatures when they are not integrated, i.e., 15 degrees and 0 degrees is observed.

That is, as described above, it is known that the integrated correction optical element 20 in the pre-deflection optical system 5 and fθ lens 21a become more likely to be affected equally by the ambient temperature (or humidity) change and, when the temperature (or humidity) change is different, the influence by the difference is quickly reduced.

Figure 6A:
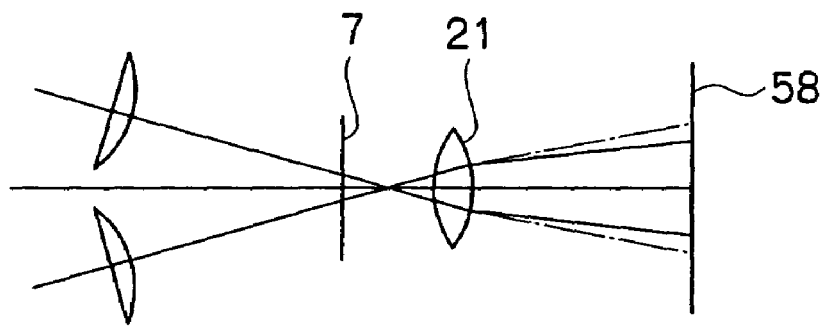
FIGS. 6A to 6C are explanatory views showing that the displacement in the sub-scanning direction when the temperature changes can be made smaller than that in the conventional device by integrating a correction optical element and an fθ lens.
Figure 6B:
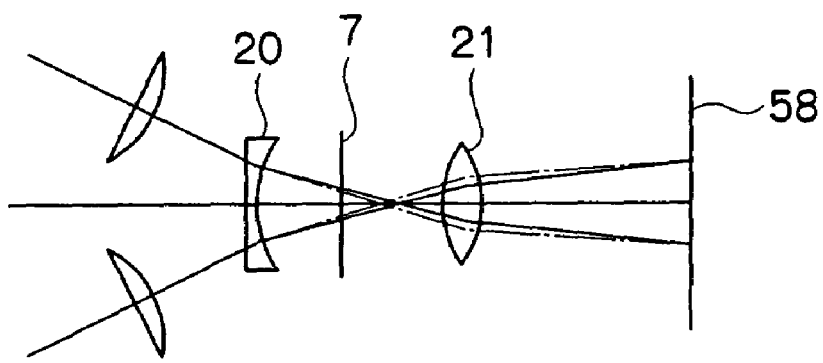
Figure 6C:
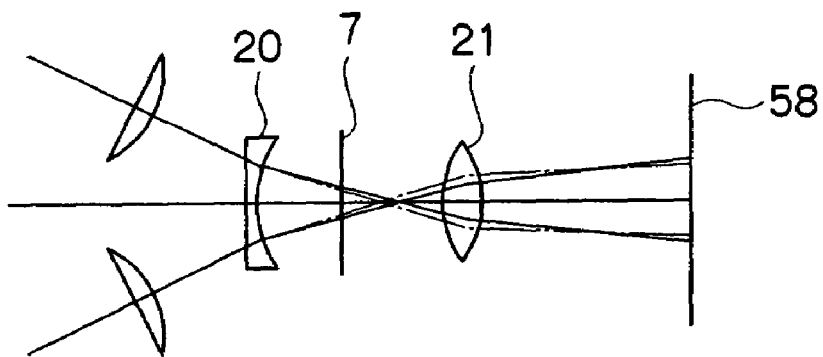

FIGS. 6A to 6C are explanatory views showing that the displacement in the sub-scanning direction when the temperature changes can be made smaller than that in the conventional device by integrating the correction optical element 20 and the fθ lens 21a.

FIGS. 6A to 6C show a pair of fθ lenses equivalently as one lens. Further, in FIGS. 6A to 6C, of four beams, a laser beam located uppermost in the position in the sub-scanning direction on the scanned surface (e.g., LY) and a laser beam located lowermost (e.g., LB) are shown. FIG. 6A shows a conventional system in which the correction optical element 20 does not exist, FIG. 6B shows the case of the first embodiment, and FIG. 6C shows a conventional system in which the correction optical element 20 exists but is not integrated.

As shown in FIG. 6A, typically, when the temperature rises, the absolute value of the power becomes smaller because of the effect that the size becomes larger and the effect that the refractive index of the lens material becomes smaller. Thereby, pitches between beams on the image plane in the case where the folds by the mirrors are developed become larger.

Contrary, an optical element (correction optical element 20) having a negative power in the sub-scanning direction is inserted into the pre-deflection optical system, as shown in FIG. 6B, when the temperature rises, the operation can be provided toward which the pitches between beams on the image plane in the case where the folds by the mirrors are developed become smaller, and, using this, the amount of pitch change between beams on the scanned surface can be set to an arbitrary value. Note that, when the temperature largely differs between the correction optical element 20 and the fθ lens 21 (21a) after deflection, as shown in FIG. 6C, this results in opposite effect that characteristics are deteriorated. Since the temperature difference can be suppressed by integrating (one of) lenses of the post-deflection optical system and a lens in the pre-deflection optical system for alleviating the influence by temperature change, the temperature condition assumed at the time of designing becomes easier to be held (the temperature of (one of) lenses of the post-deflection optical system and the temperature of a lens in the pre-deflection optical system for alleviating the influence by temperature change are equal).

The optical beam scanning device 1 of the first embodiment is configured so that the temperature relationship does not change largely from the design estimation by integrating the correction optical element 20 having a correction function in the pre-deflection optical system and the fθ lens 21a in the post-deflection optical system in order not to cause the phenomenon shown in FIG. 6C.

Figure 7A:
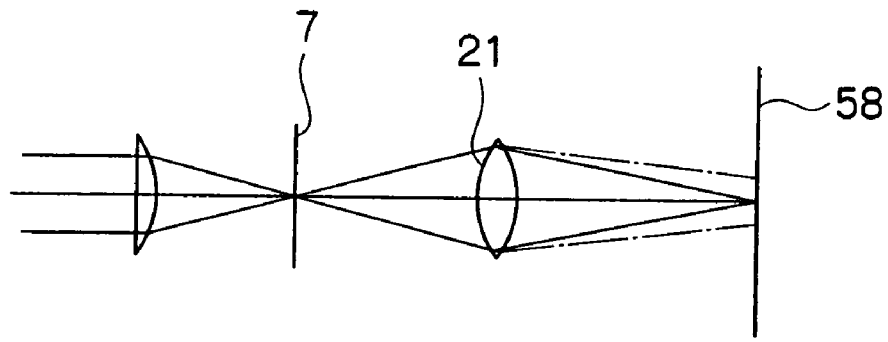
FIGS. 7A to 7C are explanatory views showing that the amount of defocus when the temperature changes can be made smaller by integrating the correction optical element and the fθ lens.
Figure 7B:
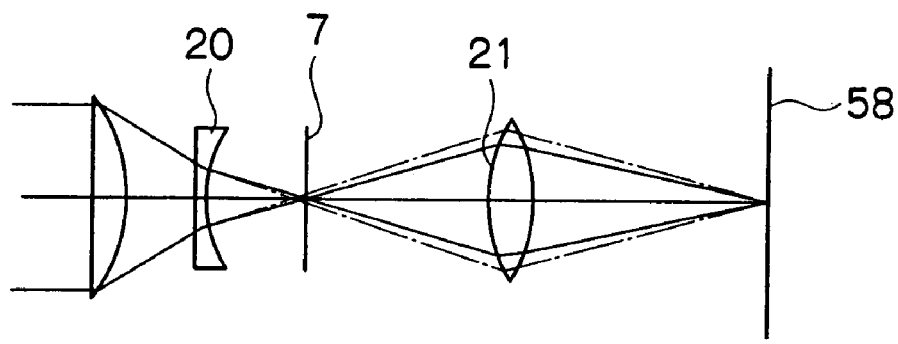
Figure 7C:
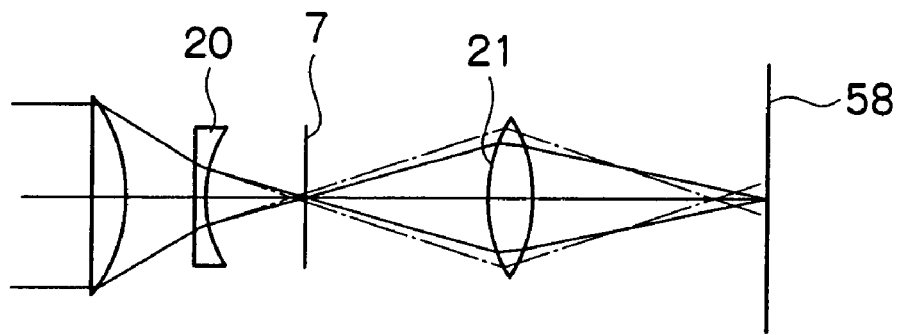

FIGS. 7A to 7C are explanatory views showing that the amount of defocus when the temperature changes can be made smaller by integrating the correction optical element 20 and the fθ lens 21a. FIGS. 7A to 7C also show a pair of fθ lenses equivalently as one lens. Further, in FIGS. 7A to 7C, one laser beam of four laser beams is extracted and shown. FIG. 7A shows a conventional system in which the correction optical element 20 does not exist, FIG. 7B shows the case of the first embodiment, and FIG. 7C shows a conventional system in which the correction optical element 20 exists but is not integrated.

As shown in FIG. 7A, typically, when the temperature rises, the absolute value of the power becomes smaller because of the effect that the size becomes larger and the effect that the refractive index of the lens material becomes smaller. Thereby, the imaging position becomes farther and the defocus occurs.

Contrary, if an optical element (correction optical element 20) having a negative power in the sub-scanning direction is inserted into the pre-deflection optical system, as shown in FIG. 7B, when the temperature rises, a beam is once imaged before that at the normal temperature. Since the degree can be set arbitrarily according to the magnitude of the power and the position of the correction optical element 20, it can be also set toward that the variations in the imaging position after deflection are cancelled. Note that, when the temperature largely differs between the correction optical element 20 and the fθ lens 21 (21a), as shown in FIG. 7C, that results in opposite effect that characteristics are deteriorated. Since the temperature difference can be suppressed by integrating (one of) lenses of the post-deflection optical system and a lens in the pre-deflection optical system for alleviating the influence by temperature change, the temperature condition assumed at the time of designing becomes easier to be held (the temperature of (one of) lenses of the post-deflection optical system and the temperature of a lens in the pre-deflection optical system for alleviating the influence by temperature change are equal).

The optical beam scanning device 1 of the first embodiment is configured so that the temperature relationship does not change largely from the design estimation by integrating the correction optical element 20 having a correction function in the pre-deflection optical system and the fθ lens 21a in the post-deflection optical system in order not to cause the phenomenon shown in FIG. 7C.

As described above, the intension of providing the correction optical element 20, i.e., the suppression of displacement in the sub-scanning direction and defocus can be exerted regardless of different temperature change depending on location by integrating the correction optical element 20 having the correction function in the pre-deflection optical system and the fθ lens 21a in the post-deflection optical system.

Furthermore, the following effects can be exerted by integrating the correction optical element 20 having the correction function in the pre-deflection optical system and the fθ lens 21a in the post-deflection optical system.

The number of components can be reduced and the attaching components and man hour can be reduced.

Further, the relative position between the post-deflection optical system and the correction optical element 20 can be easily held constant. Generally, since the correction optical element 20 in the pre-deflection optical system is small, the angle easily varies due to dimension errors in the mounting parts; however, by integrally arranged with a larger lens, the angle variation due to dimension errors in the mounting parts can be made difficult to occur.

Furthermore, in the case of molded lenses, since the characteristics are hard to be exerted at ends, it has been necessary to take distances from the effective region to the ends of the molded part. In the case where the correction optical element 20 and the fθ lens 21a in the post-deflection optical system are integrally molded, since the correction optical element 20 side of the fθ lens 21a and the fθ lens 21a post-deflection optical system side of the optical element 20 are not ends of the integration molding, parts outside of the effective region of these locations can be made smaller and downsizing can be realized. Moreover, for the same reason, there is an advantage that the separation angle between the optical path of the post-deflection optical system and the optical path of the pre-deflection optical system can be made smaller, and thereby, the diameter of the inscribed circle of the polygon mirror can be made smaller.

(B) Second Embodiment

Next, a second embodiment of an optical beam scanning device and an image forming apparatus according to the invention will be described. The optical beam scanning device of the second embodiment is a single-beam optical beam scanning device, and the image forming apparatus of the second embodiment uses one or plural single-beam optical beam scanning device(s).

Figure 9:
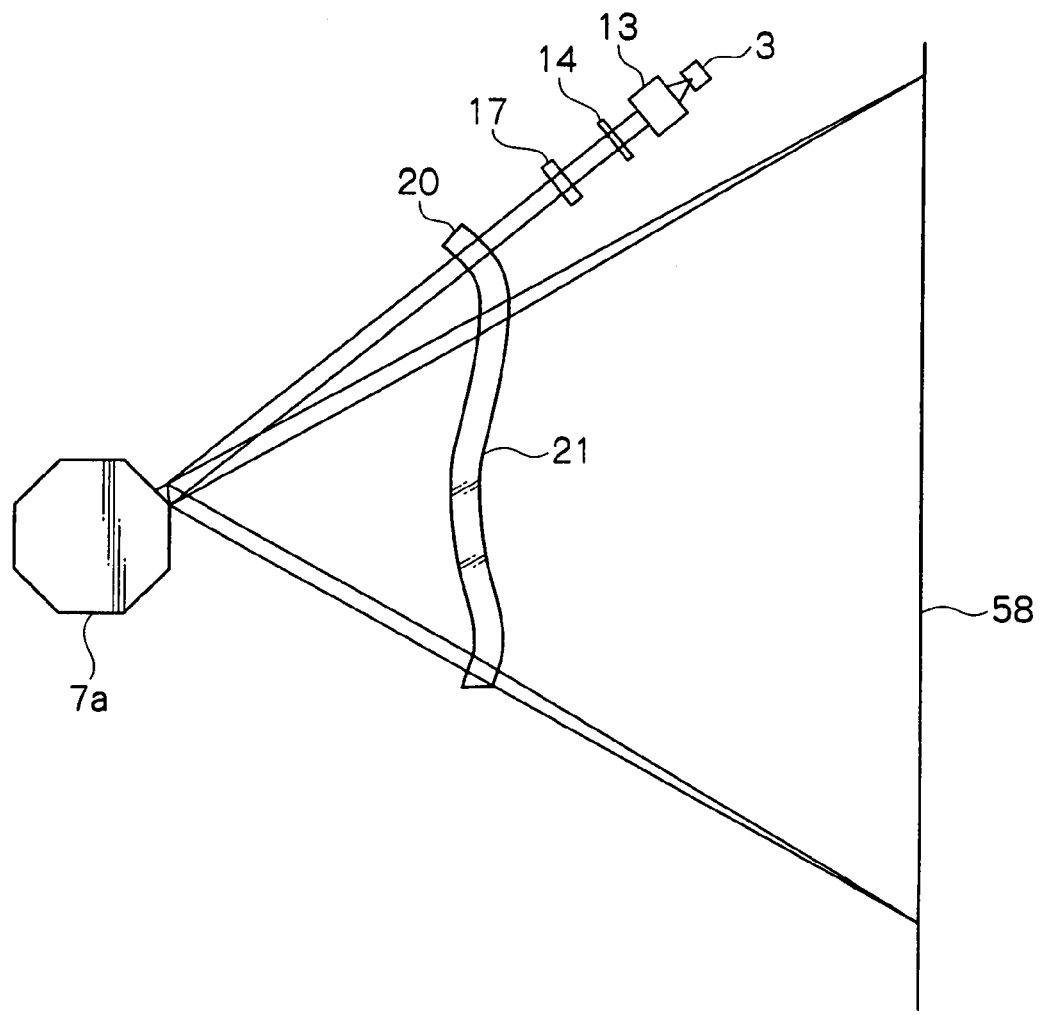
FIG. 9 is a schematic plan view showing an arrangement of optical elements in an optical beam scanning device of a second embodiment.

FIG. 9 is a plan view showing a configuration of an optical system in the optical beam scanning device of the second embodiment, and the same corresponding signs are assigned to the same corresponding parts in FIG. 2 according to the first embodiment. FIG. 9 shows the post-deflection optical system by developing the folds by the mirrors thereof as well as FIG. 2.

In FIG. 9, the optical beam scanning device 1A of the second embodiment has a light source 3 including an LD for outputting a laser beam etc., a finite focus lens (or collimator lens) 13 having a positive power in the sub-scanning direction for suppressing diffusion of the laser beam from the light source 3, a diaphragm 14 providing an arbitrary sectional beam shape to the laser beam that has passed through the finite focus lens 13, and a cylinder lens 17 of glass further providing predetermined convergence with respect to the sub-scanning direction to the beam that has passed through the diaphragm 14, and a correction optical element (correction lens) 20 in the shape of a cylinder having a negative power in the sub-scanning direction is provided at the downstream side thereof. The beam that has passed through the correction optical element 20 is arranged so as to be deflected by a polygon mirror 7a and imaged on a scanned surface 58 by a single fθ lens 21.

The fθ lens 21 of the second embodiment has a positive power in the sub-scanning direction for making the face of the polygon mirror 7a and the imaging plane in a conjugate relationship for providing a face tilt correction effect.

In the second embodiment, the optical element of the post-deflection optical system, i.e., the fθ lens 21 molded by a resin is also molded integrally with the correction optical element (resin lens) 20 within the pre-deflection optical system. Such an integrated optical element may be formed by bonding or welding separately molded parts. The heat conductivity of the fθ lens 21 and the correction optical element 20 to be integrated and the heat conductivity of a material (adhesive) used for integration are substantially equal.

By the second embodiment, the same effect as in the above described first embodiment can be also exerted. Here, according to the second embodiment, since the temperature relationship between all (one) lens 21 that determines combined power of the lenses in the post-deflection optical system and the correction optical element 20 can be held constant, the effect by the integration is greater.

(C) Third Embodiment

Next, a third embodiment of an optical beam scanning device and an image forming apparatus according to the invention will be described. The optical beam scanning device of the third embodiment is a single-beam optical beam scanning device, and the image forming apparatus of the third embodiment uses one or plural single-beam optical beam scanning device(s).

Figure 10:
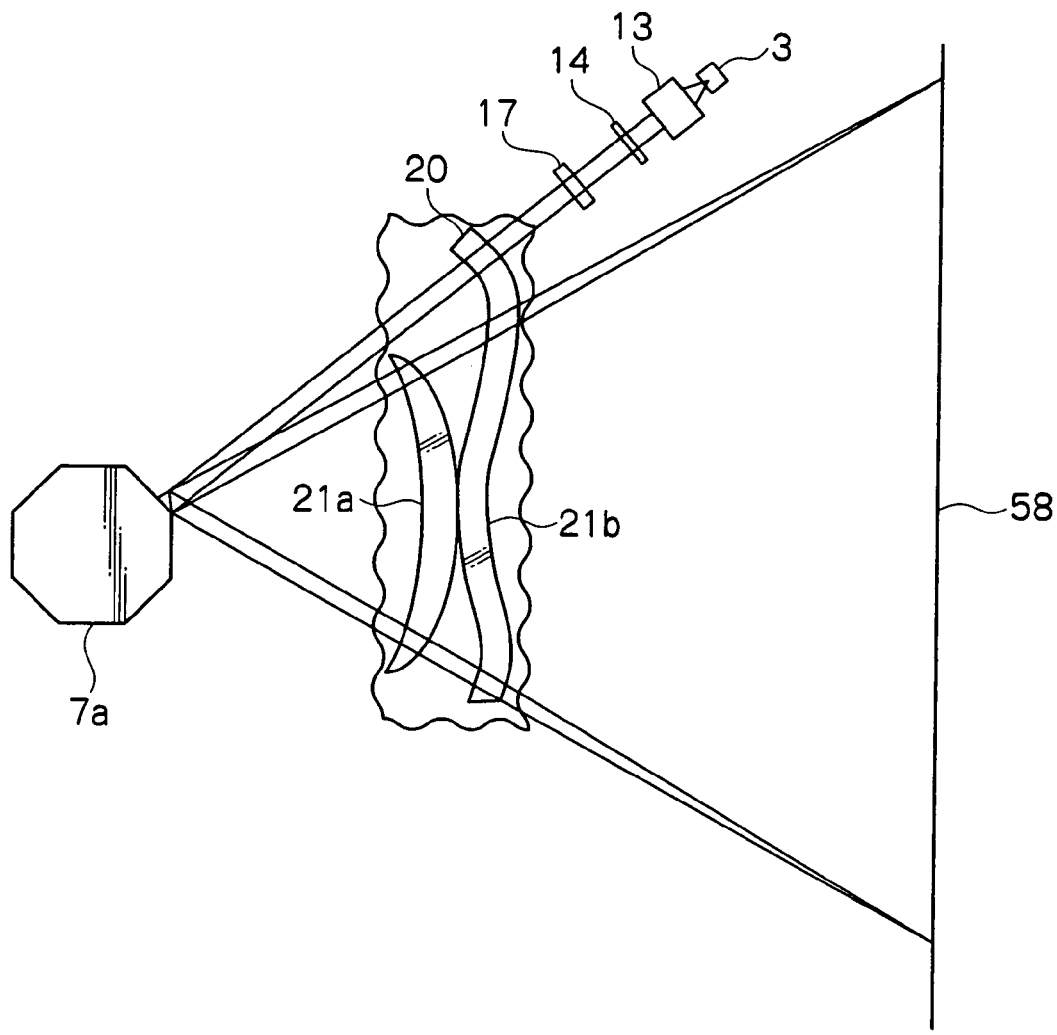
FIG. 10 is a schematic plan view showing an arrangement of optical elements in an optical beam scanning device of a third embodiment.

FIG. 10 is a plan view showing a configuration of an optical system in the optical beam scanning device of the third embodiment, and the same corresponding signs are assigned to the same corresponding parts in FIG. 2 according to the first embodiment. FIG. 10 shows the post-deflection optical system by developing the folds by the mirrors thereof as well as FIG. 2.

In FIG. 10, the optical beam scanning device 1B of the third embodiment has a light source 3 including an LD for outputting a laser beam etc., a finite focus lens (or collimator lens) 13 having a positive power in the sub-scanning direction for suppressing diffusion of the laser beam from the light source, a diaphragm 14 providing an arbitrary sectional beam shape to the laser beam that has passed through the finite focus lens 13, and a cylinder lens 17 of glass further providing predetermined convergence with respect to the sub-scanning direction to the beam that has passed through the diaphragms 14, and a correction optical element (correction lens) 20 in the shape of cylinder having a weak negative power in the sub-scanning direction is provided at the downstream side thereof. The beam that has passed through the correction optical element 20 is arranged so as to be deflected by a polygon mirror 7a and imaged on a scanned surface 58 by a pair of fθ lenses 21a and 21b.

The distance between the pair of fθ lenses 21a and 21b in the optical beam scanning device 1B of the third embodiment is close to zero.

Of these fθ lenses 21a and 21b, the fθ lens 21b at the downstream side has a positive power in the sub-scanning direction for making the face of the polygon mirror 7a and the imaging plane in a conjugate relationship for providing a face tilt correction effect, and the power in the sub-scanning direction is larger than that of the fθ lens 21a at the upstream side.

In the third embodiment, the fθ lens (e.g., resin lens) 21b at the downstream side is molded integrally with the correction optical element (e.g., resin lens) 20 within the pre-deflection optical system. Such an integrated optical element may be formed by bonding or welding separately molded parts. The heat conductivity of the fθ lens 21b and the correction optical element 20 to be integrated and the heat conductivity of a material (adhesive) used for integration are substantially equal.

By the third embodiment, the same effect as in the above described first embodiment can be also exerted. In the case of the third embodiment, since the temperature relationship between the fθ lenses that greatly affect combined power of the lenses in the post-deflection optical system in the sub-scanning direction and the correction optical element can be held constant, the effect of the integration is greater.

(D) Other Embodiments

Various modified embodiments have been cited in the above description of the respective embodiments, and further, the following modified embodiments can be cited.

Figure 11A:
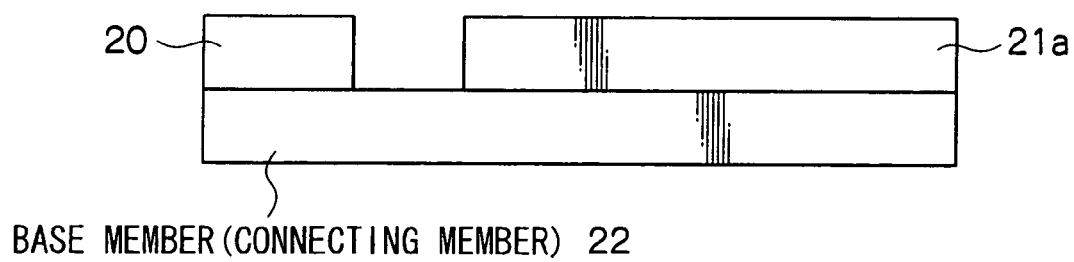
FIGS. 11A and 11B are explanatory views of a method of integration using a connecting member between the fθ lens and the correction optical element.
Figure 11B:
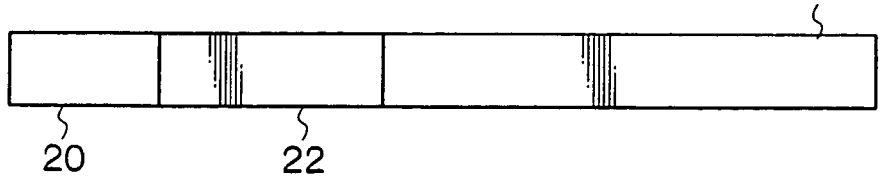

In the respective embodiments, the integration of the fθ lens and the correction optical element has been performed by a method which provides for integrally molding the correction optical element at the one end of the fθ lens, or a method which provides for bonding or welding the separately molded fθ lens to the correction optical element; however, they may be integrated by other methods. For example, as shown in FIG. 11A, they may be integrated by being connected at the lower part or upper part via a connecting member 22 such as a base member or ceiling member (for example, a part of the base member or the like is attached to the frame of the optical beam scanning device). Moreover, as shown in FIG. 11B, they may be integrated between the ends of the fθ lens and the correction optical element by linearly connecting via the connecting member 22. In other words, the integration method shown in FIG. 11B is a method in which the connecting member is sandwiched between the fθ lens and the correction optical element. Here, the heat conductivity of the connecting member may be the same as those of the both optical elements as targets of integration or different from those. Examples of a material for the connection member are preferably materials easy to conduct heat (for example, metal such as aluminum) or the same materials as both optical elements to be integrated. Also in the connecting member, it is preferable because the larger cross section, the better heat conduction.

Further, in the first and third embodiments, in the case where a set of plural fθ lenses are provided, one of the lenses has been integrated with the correction optical element; however, plural fθ lenses may be integrated with the correction optical element. For example, using the connecting member such as the base member or the ceiling member shown by wavy lines in FIG. 10, the plural fθ lenses can be integrated with the correction optical element. Further, for example, although not shown, the correction optical element and one fθ lens are integrated and plural fθ lenses are integrated with each other at both right and left ends or one end, and, as a result, plural fθ lenses may be integrated with the correction optical element.

Furthermore, in the respective embodiments, plural members to be integrated have been described as resin lenses; however, glass lenses may be integrated with each other or members of different materials may be integrated.

Moreover, in the respective embodiments, the correction optical element within the pre-deflection optical system and the fθ lens within the post-deflection optical system have been integrated; however, the combination of the correction optical element within the pre-deflection optical system and the fθ lens of the post-deflection optical system to be integrated is not limited to those in the respective embodiments. For example, the cylinder lens within the pre-deflection optical system and the fθ lens of the post-deflection optical system may be integrated. In this case also, effects related to mountability etc. for the optical elements within the pre-deflection optical system as small parts can be obtained.

What is claimed is:

1. An optical beam scanning device comprising:
   a single light deflector;
   a pre-deflection optical system which is entered a beam from a light source into the light deflector; and
   a post-deflection optical system wtiich images a reflection beam from the light deflector on a scanned surface, wherein at least one optical element of the pre-deflection optical system is integrated with at least one optical element of the post-deflection optical system through which light traveling to an image surface passes, the at least one optical element of the pre-deflection optical system and the at least one optical element of the post-deflection comprising an integrated component.

2. The optical beam scanning device according to claim 1, wherein the at least one integrated optical element of the post-deflection optical system in the integrated component is an θ lens, and wherein the at least one integrated optical element of the pre-deflection optical system in the integrated component is a correction lens which alleviates an influence by temperature change of the post-deflection optical system.

3. The optical beam scanning device according to claim 2, wherein the correction lens is a resin lens having a negative power in a sub-scanning direction.

4. The optical beam scanning device according to claim 2, wherein the integrated optical element of the post-deflection optical system is an fθ lens closest to the light deflector among plural fθ lenses.

5. The optical beam scanning device according to claim 1, wherein the at least one integrated optical element of the post-deflection optical system in the integrated component is a lens having a positive power in a sub-scanning direction, and wherein the at least one integrated optical element of the pre-deflection optical system in the integrated component is a lens having a negative power in the sub-scanning direction.

6. The optical beam scanning device according to claim 1, wherein the integrated optical element of the post-deflection optical system in the integrated component is an only imaging lens having a positive power in a sub-scanning direction in the post-deflection optical system, and wherein the at least one integrated optical element of the pre-deflection optical system in the integrated component is a lens having a negative power in the sub-scanning direction.

7. The optical beam scanning device according to claim 1, wherein the integrated optical element of the pre-deflection optical system is brought into surface contact with the optical element of the post-deflection optical system.

8. The optical beam scanning device according to claim 1, wherein the integrated optical element of the pre-deflection optical system has substantially equal heat conductivity to the optical element of the post-deflection optical system.

9. The optical beam scanning device according to claim 1, wherein the optical element of the pre-deflection optical system is integrally molded with the optical element of the post-deflection optical system.

10. The optical beam scanning device according to claim 1, wherein the optical element of the pre-deflection optical system and the optical element of the post-deflection optical system are integrated by welding.

11. The optical beam scanning device according to claim 1, wherein the optical element of the pre-deflection optical system and the optical element of the post-deflection optical system are integrated by adhesive.

12. The optical beam scanning device according to claim 11, wherein the optical element of the pre-deflection optical system, the optical element of the post-deflection optical system and the adhesive have substantially equal heat conductivity.

13. The optical beam scanning device according to claim 1, wherein the optical element of the pre-deflection optical system is integrated with the optical element of the post-deflection optical system through a connecting member.

14. The optical beam scanning device according to claim 13, wherein the optical element of the pre-deflection optical system, the optical element of the post-deflection optical system, and the connecting member have substantially equal heat conductivity.

15. An image forming apparatus comprising:
   an optical beam scanning device having a single light deflector,
   a pre-deflection optical system which is entered a beam from a light source into the light deflector, and
   a post-deflection optical system which images a reflection beam from the light deflector on a scanned surface, and integrating at least one optical element of the pre-deflection optical system and at least one optical element of the post-deflection optical system through which light traveling to an image surface passes; and
   a photoconductor including the scanned surface on which a latent image is formed based on the beam from the optical beam scanning device.

16. An optical component for an optical beam scanning device formed by integrating at least one optical element of a pre-deflection optical system of an optical beam scanning device and at least one optical element of the post-deflection optical system of the optical beam scanning device, the at least one optical element of the post-deflection optical system being an optical element through which light traveling to an image surface passes.

* * * * *